United States Patent [19]

Chin et al.

[11] Patent Number: 4,823,347

[45] Date of Patent: Apr. 18, 1989

[54] DEFERRED PARITY CHECKING OF CONTROL SIGNALS ACROSS A BIDIRECTIONAL DATA TRANSMISSION INTERFACE

[75] Inventors: Victor H. Chin; Carol Chihara; Allen S. Sha, all of San Jose, Calif.

[73] Assignee: International Business Machines Corporation, Armonk, N.Y.

[21] Appl. No.: 50,778

[22] Filed: May 18, 1987

[51] Int. Cl.⁴ ............................................. G06F 11/10
[52] U.S. Cl. ........................................ 371/49; 371/22
[58] Field of Search .................. 371/22, 49, 50, 51, 371/67, 68; 364/200 MS File, 900 MS File

[56] References Cited

U.S. PATENT DOCUMENTS

| | | | |
|---|---|---|---|
| 3,484,745 | 6/1967 | Sourgens | 340/146.1 |
| 3,763,470 | 10/1973 | Geng | 371/49 |
| 3,914,741 | 10/1975 | Bonser | 371/49 |
| 3,943,348 | 3/1976 | Akriche et al. | 235/153 |
| 3,999,053 | 12/1976 | Dalmasso | 235/153 A |
| 4,296,495 | 10/1981 | Bursztejn | 371/22 |
| 4,500,953 | 2/1985 | Takezoe et al. | 364/200 |
| 4,556,958 | 12/1985 | Ugon | 371/49 X |
| 4,737,956 | 4/1988 | Zombolas | 371/49 |

Primary Examiner—Jerry Smith
Assistant Examiner—Robert W. Beausoliel, Jr.
Attorney, Agent, or Firm—Baker, Maxham, Jester & Meador

[57] ABSTRACT

Control signal reliability across an I/O limited, high-speed data transmission interface is assured by time-sequenced transmission of control signals and parity signals. Two sets of control signals are transferred in opposing directions across the data transmission interface in a first data transfer period, during which their joint parity is determined and latched on each side of the interface, and the result of one latched joint parity determination is transmitted across the interface. During the following data transfer period, the transmitted parity is compared with the other joint parity determination, the results of the comparison being used to detect transmission errors in the control signals.

10 Claims, 4 Drawing Sheets

DEFERRED PARITY CHECKING OF CONTROL SIGNALS ACROSS A BIDIRECTIONAL DATA TRANSMISSION INTERFACE

BACKGROUND OF THE INVENTION

The invention concerns the use of parity signals to validate the transmission of control signals across an I/O limited, high-speed, bidirectional data transmission interface. Two sets of control signals are transferred in opposing directions across the data transmission interface, on each side of the interface parity is generated jointly from the two sets of control signals, and one of the parity determinations is transferred across the data transmission interface to be compared with the other parity determination for validation of the control signals.

In data processing systems, transfer of data between modularized system components can take place under the control of a single processor to which the units interchanging data are connected. The units exchange data across a data transmission interface, with the data exchange proceeding according to a protocol which is implemented by control signals also exchanged between the units The data interchange units of such a system can be modularized to the degree that each unit is physically replaceable in the system by an identical unit. The most widely employed technique of modularization is that of mounting data interchange units on field replaceable modules such as rack-mounted circuit boards with pluggable interfaces. In modern systems employing such modularization, the bandwidth of a data transmission interface between two modules can climb to hundreds of megahertz, with data being transferred in both directions between the modules.

Conventionally, control signals are employed to implement a data transfer protocol between modules, with control signals having the bandwidth of the data signals. Control signals are normally transferred across a data transmission interface between a pair of modules bidirectionally, by means of two oppositely-directed control signal highways. A control signal highway may comprise a plurality of signal lines which support the parallel transfer of binary digits (bits) referred to as a set of control signals or a control word.

It is important to provide error checking over the control signals transferred between a pair of data interchange units to ensure the detection of errors affecting the control signals that might interfere with the integrity of the data transmission between the units. Another purpose of error checking is to assist in the determination and isolation of malfunctioning units. Once a malfunctioning unit is detected, it can be replaced in the field. The ability to detect and isolate errors at a data interchange unit level supports a repair and maintenance philosophy that accommodates the concept of field replaceable units (FRU).

Sufficient error checking is difficult to implement where the signal paths between FRU's are limited or not available, or when the data rate is high and the physical distance and propagation delays are long between the units. In the context of control lines, error checking for a high-speed, bidirectional data interface is always a difficult task, due to the multidirectional flow of the control lines as they control data transfer across the data transmission interface between a pair of FRU's.

One expects the data transfer rate between FRU's to continue to increase in the future. Increasing the data transfer rate will eventually make the physical length of the overall data transfer path become the limiting factor on data transmission. In addition, as FRU's become increasingly packed with higher density components, implying the requirement for even more high-speed data transfer, input/output (I/O) transfer paths will soon be at a premium, taking into account the limitations on such transfer imposed by the physical dimensions of card connector technology; often there are an insufficient number of data paths available to supply all the data and control interconnections necessary to support the operational functional complement of a field replaceable unit, let alone the error-checking functions.

Given the limitations on data transfer bandwidth and data path availability, the luxury of providing a dedicated error-checking path for each control signal pathway is rapidly becoming unaffordable.

In order to assure the integrity of control signals exchanged between data interchange units over a data transmission interface, it is necessary to allocate I/O resources for the exchange of error checking information in a fashion which is timely enough to maintain the bandwidth of control signal transfer, yet which consumes as little of the valuable I/O resources as possible.

SUMMARY OF THE INVENTION

The inventors provide error checking of control signal transfer across the data transmission interface between a pair of data interchange units by means of a single, unidirectional error checking signal path across that interface. The invention is premised on the critical observation that error checking of joint control signal characteristics on both sides of the data transmission interface can be performed independently in each of the interchange units, with the results of the joint error checking in one unit transmitted from the one to the other unit, where the result can be compared against the result performed at the receiving unit. Any disparity between the two checking signals is used to provide an indication of parity error. Further, the transfer and comparison can be postponed and performed during the time sequence period following that in which the check control signals were transferred.

In summary, the invention is an apparatus for checking the integrity of control signals which control data transfers across a bidirectional data transmission interface in a multidirectional data transmission system. The apparatus includes a first data interchange unit for transmitting first control signals and receiving second control signals across a data transmission interface during a sequence of data transfer periods and a second data interchange unit connected to the first unit for transmitting the second control signals and receiving the first control signals across the interface during the sequence of data transfer signals. A first parity generator is located in the first unit and responds to the first and to the second control signals by determining the condition of a joint characteristic of the first and second control signals and indicating the condition by a first error check signal. A first storage device responsive to the data transfer sequence and connected to the first parity generator stores the first error check signal. A second parity generator is located in the second data unit and responds to the first control signals by determining the condition of the joint characteristic of the first and second control signals and indicating the condition by a second error check signal. A second storage device also responsive to the data transfer sequence and connected to the second parity generator stores the second error check signal. Finally, the apparatus of the invention encompasses a comparator in the first unit and connected to the first and second storage devices for comparing the first and second error check signals. The comparison of the error check signals is made during a data transfer period following the data transfer period during which the first and second control signals are exchanged. The comparator provides a first indication of the result of the comparison.

This embodiment is basic to the invention; however, it is elaborated by error checking circuitry in the second unit which permits error discrimination between the first and
second data interchange units based upon an indication of disparity provided by the first comparator. In this regard, the apparatus further includes, in the second data interchange unit, a transmitter having an input through which the second control signals are applied to the second unit and an output for transmitting the second control signals across the data transmission interface. The second parity checker responds to the first control signals and to the second control signals transmitted from the output of the transmitter. The apparatus further includes a third parity generator in the second unit responsive to the first control signals and to second control signals applied to the input of the transmitter for determining the condition of the joint characteristic and indicating the condition by means of a third error check signal. A third storage device is connected to the third parity generator for storing the third error check signal. Finally, the error checking circuitry includes a second comparator connected to the second and third storage devices that compares the second and third error check signals during the time sequence following transfer of data controlled by the first and second control signals. This comparator provides a second indication of the result of the comparison.

Consideration of this summary will lead to the conclusion that the data transmission bandwidth between the first and second data units is not limited by generation and comparison of the error check signals. The error check signals generated for control signals transmitted during a first transfer sequence period are compared during the following transfer sequence period. In this respect, error checking is performed during the transfer period following the first transfer period within which the control signals being checked were transmitted. During the second transfer period, while check signals are being compared to determine the transmission integrity of the first transfer period control signals, another set of first and second control signals controlling another data transfer are being transmitted.

The invention is also expressed as a method for evaluating the integrity of control signal transmission across a data transmission interface separating two data interchange units, in which data is transferred between the units across the interface in a data transfer time sequence and under the control of control signals conducted and exchanged by the units. The method includes the steps of transferring, across the interface, first control signals from the first to the second unit and second control signals from the second to the first unit. The transfer of the first and second control signals occurs during a first transfer sequence period. Next, a joint characteristic of the first and second control signals is ascertained and indicated at the first unit, while the joint characteristic is also ascertained and indicated at the second unit. In the next step, the indication obtained at the second unit is transferred across the data transmission interface to the first unit where it is compared during a second transfer sequence period following the first period with the joint characteristic indication obtained at the first unit.

Thus summarized, the invention has the objective of reducing the call on I/O resources in a high-speed, bidirectional data transmission interface made by the need to check the integrity of control signals transmitted across the interface.

Further, the invention has the advantage of eliminating the effect such error checking has on the data transmission bandwidth across the interface.

Further objectives and other advantages of the invention will become evident when the following detailed description is read with reference to the below-described drawings.

DETAILED DESCRIPTION OF THE PREFERRED EMBODIMENT

In the description which follows, a data transmission interface denotes a shared boundary defined by common physical interconnection characteristics, signal characteristics, and functional characteristics of data units which interchange data across the interface.

Figure 1:
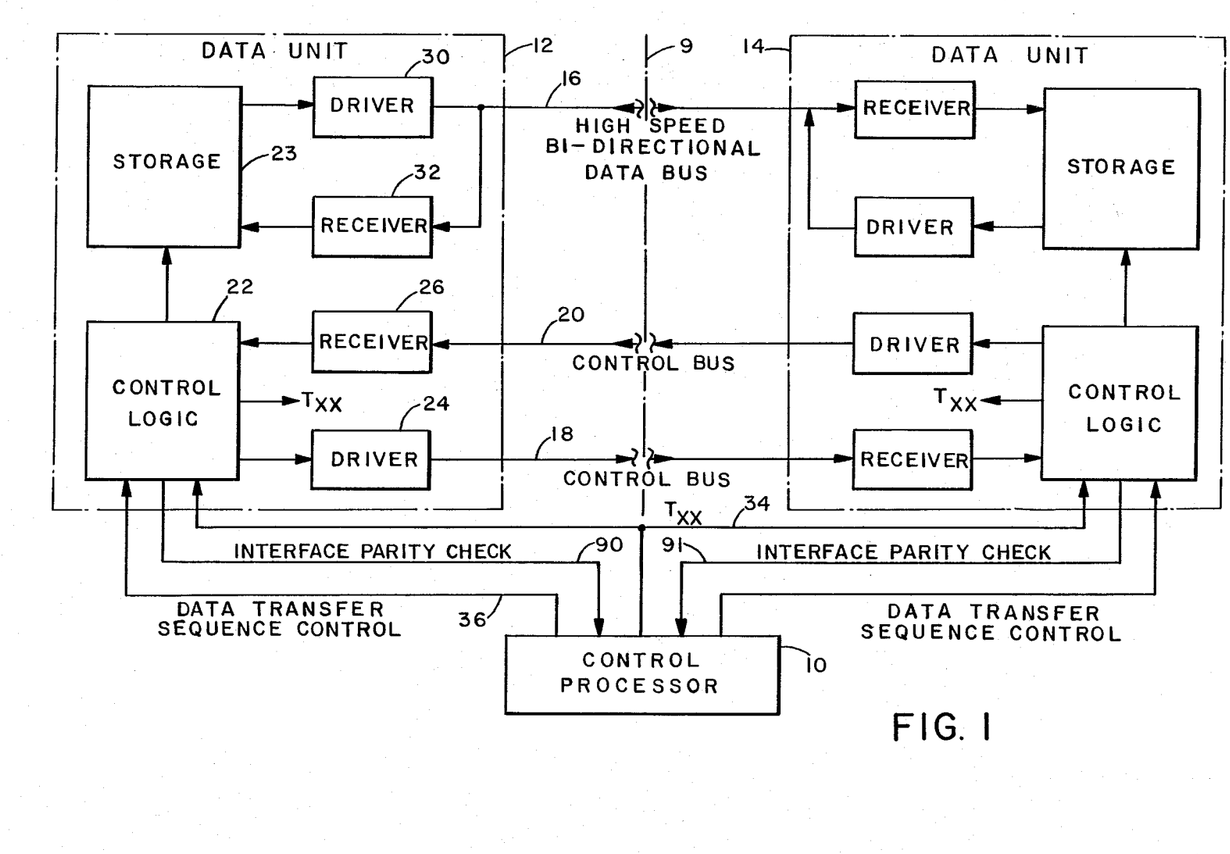
FIG. 1 is a block diagram illustrating a high-speed, bidirectional data transmission interface which operates under control of a control processor.

Data transmission across the data transmission interface 9 of FIG. 1 is orchestrated and indirectly controlled by a control processor 10. The data transmission interface is an imaginary boundary between a pair of data interchange units 12 and 14 which exchange the data on a high-speed, bidirectional databus 16 extending across the interface. Also connecting the data interchange units across the data transmission interface is a first unidirectional control bus 18 which conducts control signals unidirectionally from the unit 12 to the unit 14. Similarly, a second unidirectional control bus 20 conducts control signals unidirectionally from the unit 14 to the unit 12. The data interchange units 12 and 14 are essentially identical in structure and operation; each acts as either a source or a sink of data and provides for data communication control performed in accordance with a transmission protocol for data exchange between the units on the bus 16. In this regard, the interchange unit 12 (which is representative of the unit 14) includes control logic 22, data storage 23, a control bus driver 24, a control bus receiver 26, a databus driver 30, and a databus receiver 32. The databus driver and receiver 30 and 32 are conventionally connected between the databus 16 and the data storage 23 to buffer data between the storage and the bus. Data is written to or read from the data storage 23 in connection with a predetermined data transmission protocol characterizing data transmission across the interface between the units 12 and 14. The protocol is enforced by a conventional control sequencer residing in the control logic 22. As is known, such a sequencer can be hardwired or programmed circuitry which executes a selected one of a number of control sequences which implement data interchange between the units 12 and 14. A particular data transfer sequence to be implemented by the sequencer in the control logic 22 is indicated to the logic on the data transfer sequence control line 36 connecting the control processor 10 to the control logic 22. The control processor 10 also provides, on line 34, an appropriate data transfer sequence timing signal $T_{xx}$ for synchronization of signal exchange between the units 12 and 14. A system clock such as $T_{xx}$ can comprise a conventional multiphase clock signal which is normally received and allocated in a unit such as the data units 12 and 14 by clock reception and distribution circuitry. Such circuitry is conventional and is not illustrated or described herein. For convenience, system clock distribution within a data interchange unit is represented by a line output from a control logic and labelled "$T_{xx}3$."

As is conventional, the sequencer in the control logic 22 cooperates with a similar sequencer in the control logic of the unit 14 to exchange control signals indicative of the status of a data interchange unit while transferring data signals during a particular data transfer sequence. Such signals are also called "handshaking" signals.

Error checking of the control signals exchanged between the units 12 and 14 over the high-speed, bidirectional data transmission interface is vital to the correct execution of data exchange, yet is difficult, due to the multidirectional flow of control signals between the units 12 and 14 as they control the data transfer across the interface. One method to check the integrity of control signals conducted by the buses 18 and 20 and isolate a malfunctioning unit is shown in FIG. 2.

Figure 2:
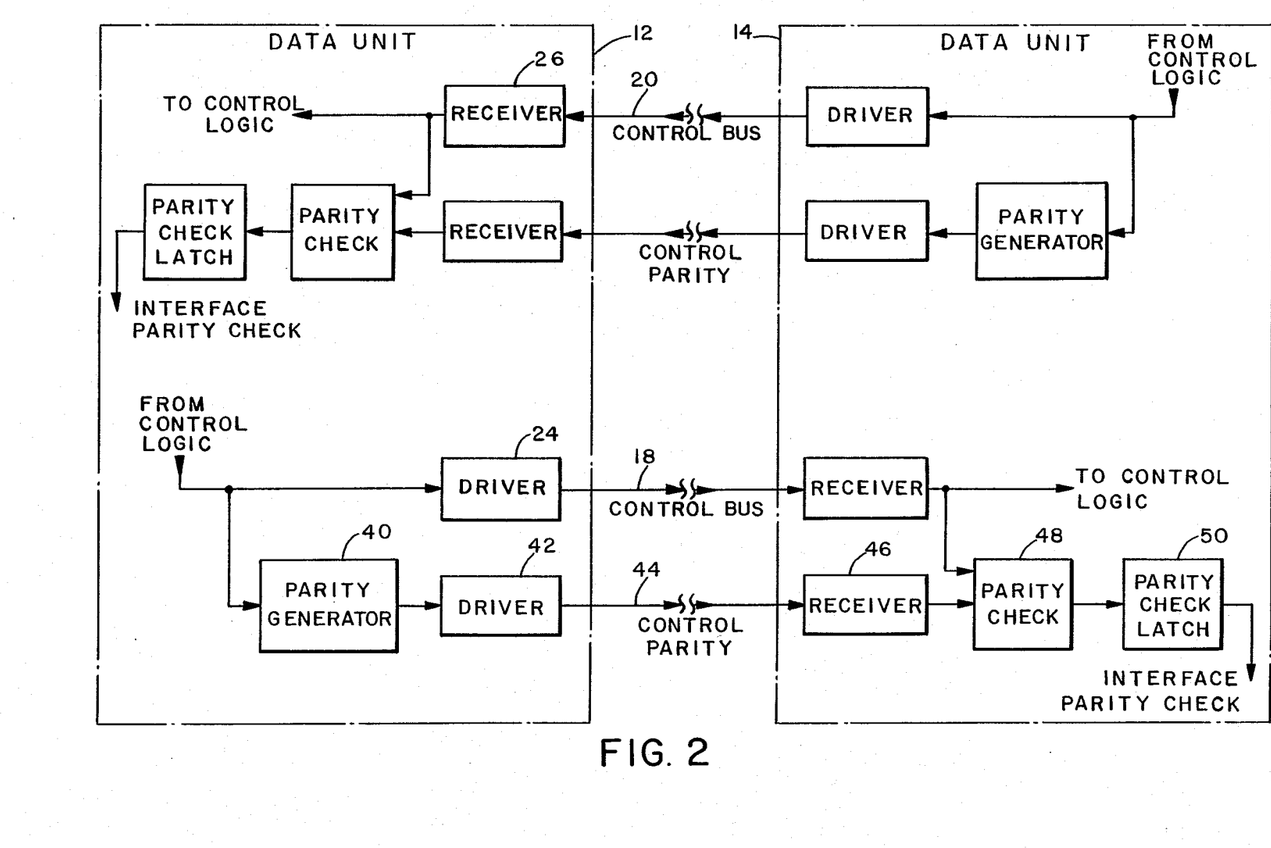
FIG. 2 is a block diagram illustrating an I/O structure for transmission across the interface of FIG. 1 in which control signal pathways have associated dedicated parity paths./

In FIG. 2, a control parity signal is added to the data transmission interface of FIG. 1 for each of the control buses 18 and 20. For example, control signal integrity on the control bus 18 is evaluated by means of a conventional parity circuit comprising a parity generator 40, a driver 42, a parity signal path 44 extending across the data transmission interface, a receiver 46, a parity checker 48, and a parity check latch 50. As conveyed by the usual sense of the parity concept, the parity generator 40 receives a group of parallel bits forming a control word to be transmitted on the control bus 18 during a given time period of a selected data transfer sequence. The parity generator 40 is conventionally an exclusive-OR tree having a structure that generates a "parity" bit which will make the sum of the control bits and parity bit odd or even according to the parity regime selected. The signal produced by the generator will be conditioned to represent the parity bit or not, as required. Hereinafter, this signal is referred to the "parity" or "error check" signal. The parity signal is provided to the driver 42 to be transferred on the parity transfer path 44 during the same time period that the control word used to generate it is transferred on the control bus 18. Both the control word and the parity bit are received in the unit 14 simultaneously and provided to the parity checker 48. The parity checker 48 determines the parity required for the received control signal and compares that determined parity against the received parity signal. If the parity indicated for the received control signal deviates from the parity indicated by the received parity signal, an error indication is provided and entered into the latch 50. The results of the parity check are provided as an interface parity check (INTFC PTY CHK) signal. As will be appreciated, the status of this signal is indicative of the integrity of the end-to-end transmission of the control signal from the data unit 12 to the data unit 14.

The circuit of FIG. 2 provides not only an independent parity check for the transmission of control signals over the buses 18 and 20, respectively, but also isolates a data interchange unit whose operation introduces error into the control signals. In this regard, the parity check performed by the checker 48 in FIG. 2 indicates the reliability of all of the transmission equipment upstream of it. Assuming the proper functioning of the receivers terminating the parity line 44 and the control bus 18, an indication of error by the parity checker 48 will be taken to signify erroneous operation of the data interchange unit 12. A field maintenance procedure based upon a response to an error indication by the parity checker 48 would entail field replacement of the data interchange unit 12 as the most probable unit at fault and unit 14 as the next probable. In the context of such a maintenance procedure, the unit 12 would also be referred to as a "field replaceable unit" (FRU).

It is manifest that, while the arrangement of FIG. 2 supports the independent evaluation of the transmission integrity of each of the buses 18 and 20, it taxes the I/O resources of both of the units 12 and 14 in that it requires dedication of a separate, respective parity transmission path for each of the control buses. In an I/O-limited environment, any reduction in the allocation of I/O resources for transmission error checking would be well received. Such reduction is provided by the invention, which is illustrated in detail in FIG. 3.

Figure 3:
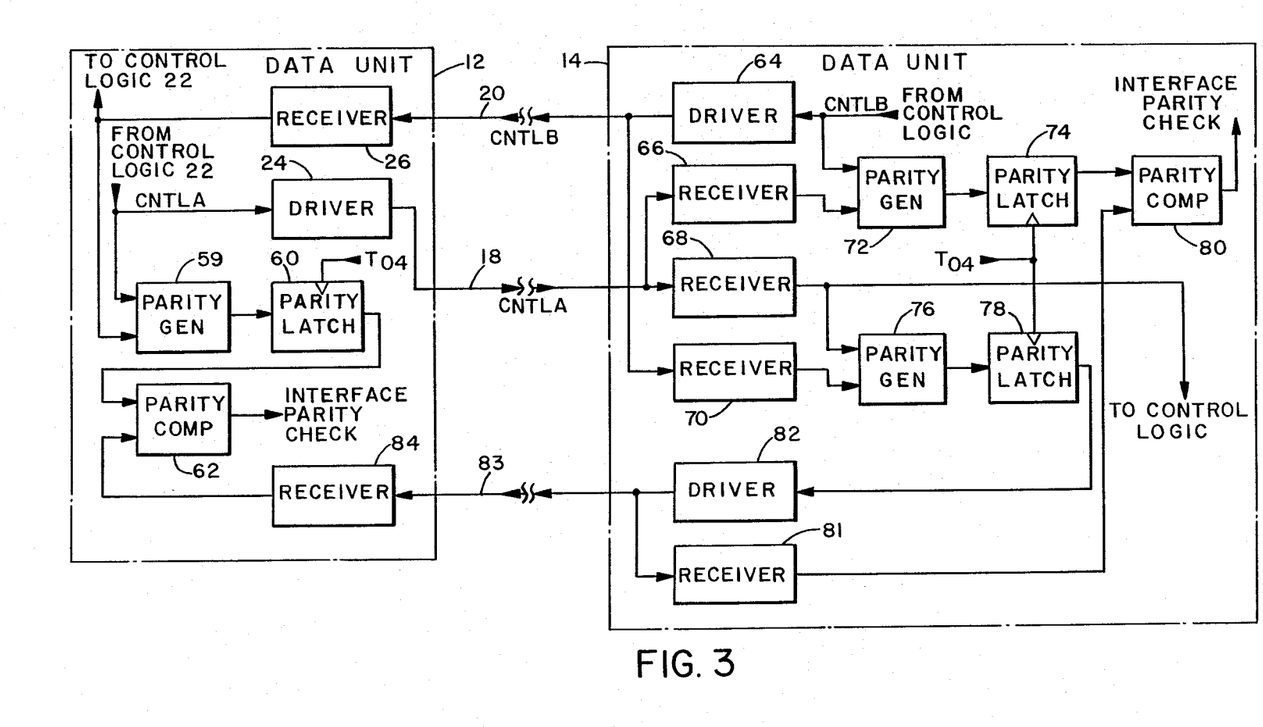
FIG. 3 is a block diagram illustrating the invention as applied to the data transmission interface of FIG. 1.

With reference to FIG. 3, the complement of parity checking circuitry in the data interchange unit 12 includes a parity generator 59 which generates a parity bit for the joint parity of control signals on the buses 18 and 20, a parity latch 60 connected to receive the output of the parity generator 59, and a parity comparator (COMP) 62 which compares a pair of parity signals, one held in the parity latch 60, and the other described below.

In the data interchange unit 14, a conventional bus driver 64 (also referred to as a "transmitter") buffers the control word generated from the control logic in the unit 14 onto the control bus 20. A pair of conventional bus receivers 66 and 68 each buffer control words from the control bus 18 into the unit 14. A third bus receiver 70 acts as a buffer between the output of the bus driver 64 and a parity generator. Two parity generators 72 and 76 are provided in the data interchange unit 14. Each of these parity generators is connected to a respective one of the parity latches 74 and 78. The parity signal held in the parity latch 78 is transmitted to the data interchange unit 12 by way of driver 82, parity transmission path 83, and receiver 84, whence it is conducted to the other input of the parity comparator 62. The parity signal at the output of the driver 82 is buffered back into interchange unit 14 through receiver 81. A parity comparator 80 compares this check signal and the check signal held in the parity latch 74.

The operation of the invention illustrated in FIG. 3 is based upon the generation of a joint parity signal indicative of the parity resulting from the joinder of control signals transmitted across the data transmission interface. In this regard the parity generator 59 and each of the parity generators 72 and 76 includes an exclusive-OR tree circuit which is conventional in all respects. The circuit samples the control words (CNTLA from unit 12 and CNTLB from unit 14) transferred across the data transmission interface during a transfer period. The parity generator 59 receives CNTLA as the control word is being provided by unit 12's control logic 22 to the driver 24 for transmission across control bus 18. The parity generator 59 receives unit 14's control word CNTLB from the receiver 26 when that control word is received from the control bus 20. CNTLA and CNTLB are fed to the exclusive-OR circuit in the parity generator, which performs the well-known exclusive-OR function on the control words to generate a parity bit. The parity signal generated by the generator 59 therefore represents the exclusive-OR joinder of the control words CNTLA and CNTLB.

The parity signal produced by the parity generator 59 is fed to the parity latch 60. The parity latch 60 is a conventional clocked latch which operates in response to the time sequence signal $T_{xx}$ provided by the control processor 10 on signal line 34 (FIG. 1).

The parity generators 72 and 76 in the data interchange unit 14 correspond essentially in structure and operation to the parity generator 59. The generator 72 produces a parity signal which results from the exclusive-OR joinder of the CNTLB control signal provided to the input of the driver 64 for transmission on control bus 20 and the CNTLA signal buffered from the control bus 18 through the receiver 66. The parity signal produced by the generator 72 is fed to the clocked parity latch 74. The parity generator 76 produces a parity signal resulting from the exclusive-OR joinder of the CNTLA control word buffered into the unit 14 from the bus 18 through the receiver 68 with the CNTLB control word buffered onto the bus 20 from the output of the driver 64 through the receiver 70. The parity signal produced by the generator 76 is fed to and stored in the clocked parity latch 78.

The parity signals produced by the parity generators 59, 72, and 76 during any data transmission sequence period are compared during a subsequent sequence period by the parity comparators 62 and 80. The comparators 62 and 80 are conventional digital comparators, each of which provides an output indicative of the equivalence or non-equivalence (disparity) of a pair of binary digits. Relatedly, the comparator 62 compares the parity signals held in the latches 60 and 78, while the comparator 80 compares parity signals in the latch 74 with the parity signal obtained from the latch 78 via the driver 82 and receiver 81. If the parity comparator 62 indicates disparity, while the parity comparator 80 indicates equivalence, the conclusion is that control signal transmission error has occurred in the data interchange unit 12. On the other hand, if disparity is indicated by comparator 80 or by both the comparators 62 and 80, the error is assumed to have arisen as the result of operations in the unit 14.

As illustration, assume one of the drivers in the driver 2 of data interchange unit 12 intermittently has failed to come on. In this case, the corresponding receivers 66 and 68 will perceive the driver to be off. The parity generators 72 and 76 will respond according to this perception of the control bus 18. As a result, the parity check produced by comparison of parity signals in the parity latches 74 and 78 will be equivalent and the comparator 80 will indicate no fault. However, the parity signal produced by the generator 76 will not be equivalent with that produced by the generator 59, and the comparator 62 will condition its parity check output to indicate disparity between its input parity signals. In this case, the equivalence indication from the comparator 80 and the disparity indication from the comparator 62 would indicate faulty operation in the interchange unit 12.

The specific operation of receiving, decoding, and interpreting the comparison signals produced by the comparators 62 and 80 can be performed by diagnostic logic residing, for example, in the program of the processor 10. Refer to FIG. 1 where the signal lines 90 and 91 and labelled "INTERFACE PARITY CHECK" provide conductivity from the units 12 and 14 to the processor 10. These lines are sourced, in the invention, by the comparators 62 and 80 as illustrated in FIG. 3. Table I below provides a mapping which can be employed by the diagnostic logic to provide a visual or other detectable indication of unit malfunction. In Table I, each possible combination of disparity indications from the comparators 62 and 80 are corresponded to the components whose malfunction would cause the combination. The location of a malfunctioning component is determinative of a faulty FRU - if the driver 64 works incorrectly, the unit 14 would be replaced by an equivalent unit. Thus, the disparity combinations can be used to indicate a faulty unit.

TABLE I

| Comparator 62 | Comparator 80 | Faulty Component(s) | Unit To Be Replaced |
|---|---|---|---|
| x | x | 68,70,76,78, or 82 | 14 |
|  | x | 64,66,72,74, or 81 | 14 |
| x |  | 24,26,59,60, or 84 | 12 |

In Table I, "x" indicates a disparity signal from a comparator. Thus, if the receiver 68 failed to operate properly, disparity would be indicated by both comparators and the diagnostic logic would provide an indication for the replacement of the unit 14.

For another example illustrative of the operation of the invention of FIG. 3 in providing fault isolation between the units 12 and 14, assume faulty operation of the receiver 66 in the data interchange unit 14. In this example the receiver 66 is used to buffer the control word CNTLA produced by the control logic in the unit 12 to the parity generator 72. If the receiver 66 has malfunctioned, the parity signal produced by the generator 72 would differ from the parity signals produced by the generators 76 and 59. In this instance, the comparator 80 would condition its output to indicate disparity, in which case faulty operation would be attributed to data interchange unit 14.

It will be evident with reference to FIG. 3 and the description provided thus far, that the invention clearly reduces the I/O resources required for conducting error checks of control signals and providing full fault isolation of the units 12 and 14: the invention requires only a single parity signal path 83 to perform error checking and to effect full isolation between two data interchange units, while the more conventional approach illustrated by FIG. 2 requires two such data paths and does not provide the same level of FRU isolation.

Figure 4:
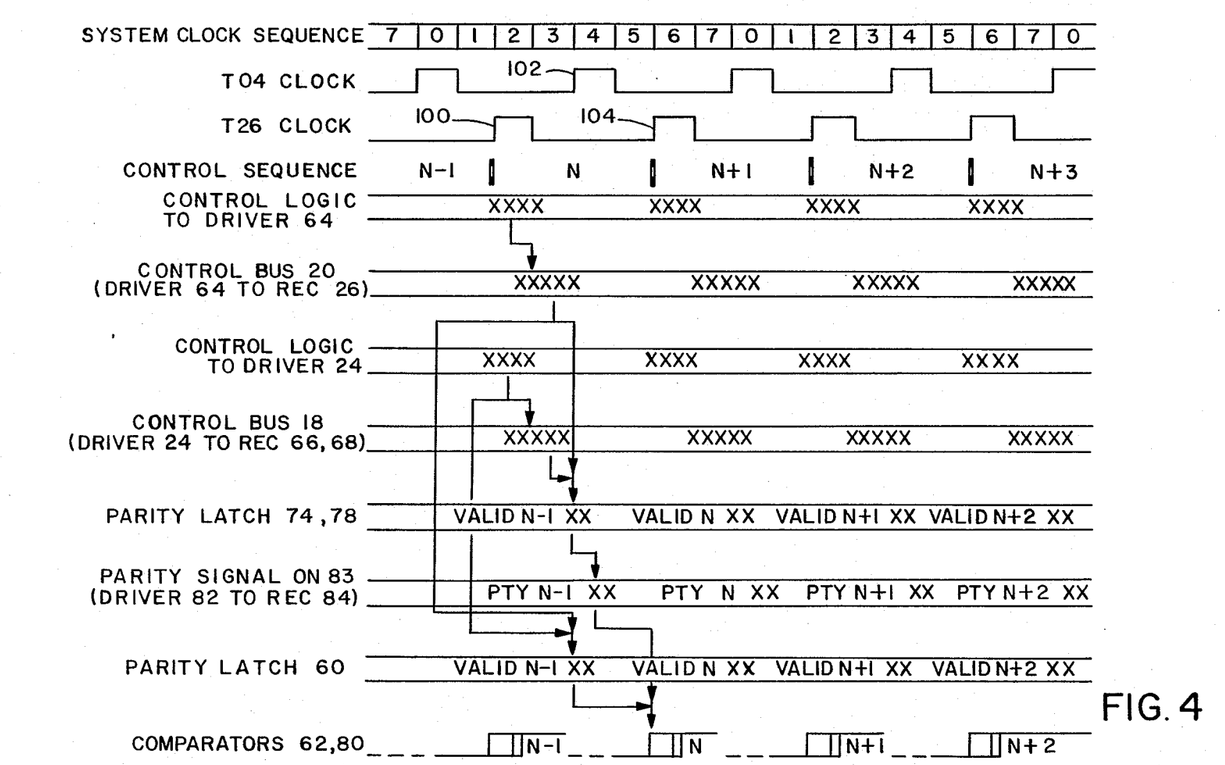
FIG. 4 is a timing diagram illustrating the sequence of operations followed by the invention.

Refer now to FIG. 4 for an understanding of how the time sequencing of the operations of the invention eliminates any effect on the data transmission bandwidth between the interchange units 12 and 14. An important aspect of the invention is the employment of parity latches 60, 74, and 78. Because of the high data rate requirement of the data transmission interface, the propagation delays of the signals necessary for checking parity can impose a limitation on the data transmission bandwidth of the interface. Propagation delays associated with parity signal generation in the interchange unit 14 and its transmission back to the interchange unit 12 are sufficiently large to prevent the reliable processing of the generated parity in the interchange unit 12 simultaneously with the transmission of the control words being checked. However, by employing latches to retain the generated parity signals and time-shifting the signals for a later comparison, the data transmission bandwidth between the units 12 and 14 is not limited by propagation delays, and the highest possible data rate can be maintained. This can be understood with reference to the timing diagram of FIG. 4, where a cyclic system clock sequence has recurring periods, each period including eight clock slots 0-7. Phased clock signals are produced by the control processor and distributed on signal line 34. These phased clock signals are denoted as $T_{xx}$, with the subscript indicating during which slots of each period the clock is active. Thus, for example, the $T_{04}$ clock is active during period slots 0 and 4, while the $T_{26}$ clock is active during period slots 2 and 6. The $T_{26}$ clock is used to define a sequence of control data transfer periods, $N-1$ through $N+3$. Thus, for example, during sequence transfer period N, control signals are exchanged between the data interchange units 12 and 14 on the control buses 18 and 20, with the control exchange including the simultaneous transmission of control signals CNTLA and CNTLB between the units on the buses 18 and 20, respectively. The $T_{26}$ clock is provided to the control logic in each of the interchange units to stage the transfer of a control word from the logic onto its respective control bus. Thus, the period denoted by N in FIG. 4 begins on the rising edge 100 of the $T_{26}$ clock. (In FIG. 4 the xxxx's signify transition states.) In response to the rising edge 100, CNTLA and CNTLB are provided to the drivers 24 and 64, respectively. A control signal is continuously asserted by a respective control logic following a rising edge of the $T_{26}$ clock until the following rising edge defining the next control sequence. Therefore, the control words CNTLA and CNTLB will be continuously available to the parity generators between successive rising edges of the $T_{26}$ clock. Hence, once presented to their respective bus drivers, CNTLA and CNTLB are buffered onto their respective control buses 18 and 20 and therefrom by bus receivers 66, 68, and 26. Since there is a period of time after the rising edge of the $T_{26}$ clock when the output of the parity generators 59, 72, and 76 is changing as the result of transmission times over the buses 18 and 20, their outputs are not sampled until the longest possible delay encountered for transmission of any control signal between the control logics of the interchange units 12 and 14. The lumped delay of driver, bus transmission, receiver, and parity generator determines when the outputs of the parity generators are to be sampled. The longest of these lumped delays is taken into account in synchronizing the $T_{04}$ clock with the $T_{26}$ clock; the period of time between the rising edges 100 and 102 in FIG. 4 exceeds the longest lumped delay expected over the data transmission interface. Thus, the outputs of the parity generators 59, 72, and 76 can be reliably sampled with the rising edge 102 of the $T_{04}$ clock. Such sampling is performed by the latches 60, 74, and 78, which capture respective parity signals with the rising edge 102. Once latched, the parity signals determine the output states of the comparators 62 and 80, which can be latched at the next rising edge 104 of the $T_{26}$ clock, which begins sequence transfer period $N+1$. This provides a sufficient transmission time for transmitting the parity signal held in the latch 78 across the data transmission interface on parity transmission path 83 back to the interchange unit 12 for input to the comparator 62. Therefore, the parity signals indicative of the joint parity of CNTLA and CNTLB during transfer period N can be evaluated by comparators 62 and 80 for error checking during signal period $N+1$, when the next set of control words is transmitted. This is indicated by waveform fragment N produced by the comparator 62. It is to be understood that the output of the comparator 80 is sampled at the same time as comparator 62 by sampling synchronization using the $T_{26}$ clock.

Obviously, many modifications and variations of the invention are possible in light of the above teachings and following claims.

We claim:

1. An apparatus for checking the integrity of control signals which control data transfers across a bidirectional data transmission interface in a multidirectional data transmission system, comprising:

a source of a sequence of data transfer timing periods, said sequence including a first timing period during which first and second sets of control signals are transferred, and a second timing period during which third and fourth sets of control signals are transferred, said second transfer period following said first transfer period in said sequence;

a first data unit for transmitting said first set of control signals and receiving said second set of control signals across a data transmission interface;

a second data unit connected to said first data unit for transmitting said second set of control signals and receiving said first set of control signals across said interface;

first parity means in said first data unit and responsive to said first and second sets of control signals for determining the condition of a joint characteristic of said first and second sets of control signals and indicating said condition by a first error check signal;

second parity means in said second data unit and responsive to said first and second sets of control signals for determining the condition of said joint characteristic of said first and second sets of control signals and indicating said condition by a second error check signal;

first storage means responsive to said sequence and connected to said first parity means for storing said first error check signal during said first data transfer period;

second storage means responsive to said sequence and connected to said second parity means for storing said second check error signal during said first data transfer period;

signal conduction means connected to said second storage means for unidirectionally conducting said second error check signal to said first data unit during said first data transfer period; and first comparator means connected to said first storage means and to said signal conduction means for comparing said first and second error check signals and for indicating the result of said comparison during said second data transfer period.

2. The apparatus of claim 1 wherein said joint characteristic is the joint parity of said first and second control signals.

3. The apparatus of claim 1 wherein said first comparator means is located in said first data unit and further including error checking means in said second data unit and connected to said signal conduction means for detecting and indicating, during said second data transfer period, control signal errors based upon said second error check signal.

4. The apparatus of claim 1 further including, in said second data unit, a transmitter having an input for receiving said second control signals, and an output for transmitting said second control signals, and wherein said second parity means includes a parity generator responsive to said first control signals and to second control signals provided at said output for producing said second error check signal.

5. The apparatus of claim 4, further including:
a third parity means responsive to said first control signals and to second control signals provided at said input for determining the condition of said joint characteristic and indicating said condition by a third error check signal; and
third storage means responsive to said sequence and connected to said third parity means for storing said third error check signal during said first data transfer period;
and wherein said error checking means includes:
second comparator means connected to said second and third storage means for comparing said second and third error check signals and for indicating the result of said comparison during said second data transfer period.

6. A method for evaluating the integrity of control signal transmission across a data transmission interface separating two data units, in which data is transferred between said units across said interface in response to a sequence of data transfer periods and under the control of control signals conducted and exchanged by said data units, said method comprising the steps of:
transferring across said interface, first control signals from said first to said second data unit and second control signals from said second to said first data unit, said transferring occurring during a first data transfer period in said sequence;
ascertaining and indicating a joint characteristic of said first and second control signals at said first data unit;
ascertaining said joint characteristic of said first and second control signals at said second data unit based upon respective signal conduction locations for said second control signals in said second data unit, and providing respective indications at said second data unit of ascertained joint characteristics;
transferring one respective indication obtained at said second data unit across said interface to said first data unit;
transferring across said interface, third control signals from said first to said second data unit and fourth control signals from said second to said first data unit, said transferring occurring during a second data transfer period following said first data transfer period in said sequence;
comparing, at said first unit and during said second data transfer period, the joint characteristic indication from said first data unit with said transferred indication from said second data unit to detect deviation between the joint characteristics ascertained at said first and second data transfer units; and
comparing at said second data unit, during said second data transfer period, said respective indications to detect deviation between the joint characteristics ascertained at said second data transfer unit.

7. The method of claim 6 wherein said joint characteristic is a parity characteristic.

8. The method of claim 7 wherein each of said steps of ascertaining includes generating a parity signal in response to said first and second control signals.

9. The method of claim 6 further including the step of combining any deviation detections obtained during said comparing steps to detect and indicate a malfunction in one of said units.

10. In a system wherein a first data unit unidirectionally transmits a first set of signals and receives a second set of signals across a data transmission interface and a second data unit connected to said first data unit unidirectionally transmits said second set of signals and receives said first set of signals across said interface, the improvement comprising means for fault-isolating one or the other of said first and second data units, in which means are provided:
first error checking means in said first data unit responsive to said first set of signals and to said second set of signals for determining a first condition of a joint characteristic of said first and second sets of signals, said first condition being based upon the transmission of said first set of signals and the deception of said second set of signals, and for indicating said first condition by a first error check signal;
first storage means in said first data unit and connected to said first error checking means for storing said first error check signal during a first predetermined transfer period in which said first and second sets of signals are transmitted and received;
signal conduction means in said second data unit for conducting said second set of signals from a first signal transmission location to a second signal transmission location connected to said first data unit;
second error checking means in said second data unit responsive to said first set of signals and to said second set of signals at said locations in said signal conducting means for determining second and third conditions of said joint characteristic, said second condition being based upon the reception of said first set of signals and the conduction of said second set of signals through said first and second signal transmission locations and for indicating said second and third conditions by a second and third error check signals, each referenced to a respective signal transmission location;
second storage means in said second data unit and connected to said second error checking means for storing said second and third error check signals during said first transfer period;
transmission means for conducting an error check signal from said second storage means to said first data unit;

first comparator means in said first data unit and connected to said first storage means and to said transmission means for comparing, during a second predetermined transmission period following said first period, said first error check signal with the error check signal conducted on said signal means an for providing a first indication of said comparison;

second comparator means in said second data unit and connected to said second storage means for comparing said second and third error check signals and providing a second indication of said comparison; and fault determining means for receiving said first and second indications and for providing an indication of data unit malfunction based upon said first and second indications.

* * * * *